(12) United States Patent
Bas Sanchez et al.

(10) Patent No.: US 9,769,648 B2
(45) Date of Patent: Sep. 19, 2017

(54) PROVISIONING CONNECTIVITY SERVICE DATA IN A TELECOMMUNICATIONS NETWORK

(75) Inventors: Maria Esther Bas Sanchez, Madrid (ES); Fuencisla Garcia Azorero, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 117 days.

(21) Appl. No.: 14/124,147

(22) PCT Filed: Jun. 15, 2011

(86) PCT No.: PCT/IB2011/052596
§ 371 (c)(1),
(2), (4) Date: Dec. 5, 2013

(87) PCT Pub. No.: WO2012/172388
PCT Pub. Date: Dec. 20, 2012

(65) Prior Publication Data
US 2014/0128050 A1 May 8, 2014

(51) Int. Cl.
*H04W 8/22* (2009.01)
*H04N 21/418* (2011.01)
(Continued)

(52) U.S. Cl.
CPC ........... *H04W 8/22* (2013.01); *H04L 65/1069* (2013.01); *H04N 21/2362* (2013.01);
(Continued)

(58) Field of Classification Search
None
See application file for complete search history.

(56) References Cited

U.S. PATENT DOCUMENTS 7,305,090 B1    12/2007  Hayes et al.
2009/0081996 A1  3/2009  Duggal et al.
(Continued)

FOREIGN PATENT DOCUMENTS

WO    2008028292 A1    3/2008
WO    2009092115 A2    7/2009
(Continued)

OTHER PUBLICATIONS

Extended European Search Report dated Jan. 30, 2015 for European Application No. 1 186 7737.6-1905, European Filing Date Jun. 15, 2011 consisting of 7-pages.
(Continued)

*Primary Examiner* — Charles Appiah
*Assistant Examiner* — Margaret G Mastrodonato
(74) *Attorney, Agent, or Firm* — Christopher & Weisberg, P.A.

(57) ABSTRACT

A method is proposed of provisioning connectivity service data for a device when the device attaches to a telecommunications network. The connectivity service data comprises information required to enable connectivity between the device and at least one further device of the network. Dynamic data relating to the device is obtained as part of one of the device attaching to the telecommunications network and a previous attachment of the device to the network. The dynamic data is of a type that may change from one such attachment to another such attachment of the same device. The connectivity service data is then selected based on the obtained dynamic data. It is then arranged for the selected connectivity service data to be provisioned to the device.

14 Claims, 9 Drawing Sheets

(51) Int. Cl.
H04N 21/2362 (2011.01)
H04W 60/00 (2009.01)
H04W 4/00 (2009.01)
H04L 29/06 (2006.01)
H04W 8/12 (2009.01)
H04W 60/04 (2009.01)

(52) U.S. Cl.
CPC ........ *H04N 21/4182* (2013.01); *H04W 4/005* (2013.01); *H04W 60/00* (2013.01); *H04W 8/12* (2013.01); *H04W 60/04* (2013.01)

(56) References Cited

U.S. PATENT DOCUMENTS

| 2010/0057485 | A1 | 3/2010 | Luft |
| 2010/0069062 | A1* | 3/2010 | Horn et al. .................. 455/434 |
| 2012/0178418 | A1* | 7/2012 | Yu .................. H04W 4/001 455/411 |
| 2012/0220326 | A1* | 8/2012 | Li .................. H04W 4/005 455/509 |
| 2014/0007200 | A1* | 1/2014 | Zisimopoulos ....... H04L 63/102 726/4 |

FOREIGN PATENT DOCUMENTS

| WO | 2009092115 A3 | 7/2009 |
| WO | WO2009092115 A2 | 7/2009 |
| WO | 2010037202 A1 | 4/2010 |
| WO | 2011008588 A1 | 1/2011 |
| WO | 2011036484 A2 | 3/2011 |
| WO | 2011051182 A1 | 5/2011 |

OTHER PUBLICATIONS

ETSI TS 123.003 V10.1.0 (Apr. 2011) Digital Cellular Telecommunications System (Phase 2+); Universal Mobile Telecommunications System (UMTS); Numbering, addressing and identification (3GPP TS 23.003 version 10.1.0 Release 10) Technical Specification, European Telecommunications Standards Institute (ETSI), 650, Route Des Lucioles; F-06921 Sophia-Antipolis; France, vol. 3GPP CT 4, No. V10.1.0, XP014064689, Apr. 1, 2011 consisting of 81-pages.

3GPP TR 33.812 V9.2.0 (Jun. 2010) 3rd Generation Partnership Project; Technical Specification Group Services and System Aspects; Feasibility study on the security aspects of remote provisioning and change of subscription for Machine to Machine (M2M) equipment (Release 9) Jun. 2010 consisting of 87-pages.

3GPP TS 23.003 V10.1.0 (Mar. 2011) Technical Specification Group Core Network and Terminals; Numbering, addressing and identification (Release 10) Mar. 2011 consisting of 79-pages.

International Search Report dated Feb. 29, 2012 for International Application No. PCT/IB2011/052596, International Filing Date: Jun. 15, 2011 consisting of 5-pages.

Communication dated Jun. 27, 2017 for European Application No. 11 867 737.6-1901 European Filing Date: Jun. 15, 2011 consisting of 6-pages.

* cited by examiner

PROVISIONING CONNECTIVITY SERVICE DATA IN A TELECOMMUNICATIONS NETWORK

TECHNICAL FIELD

The present invention relates to the provisioning of connectivity service data in a telecommunications network. In particular, but not exclusively, the invention relates to the field of automated provisioning ("auto-provisioning") of terminal equipments connectable to a telecommunications network and, more precisely, to auto-provisioning of data for Machine-to-Machine (M2M) devices.

BACKGROUND

A common issue for network operators operating telecommunications networks (such as network operators operating traditional 2G mobile networks, or the most recent 3G networks) is the technical complexity of subscription provisioning, which can in turn lead to increased capital expenses (CAPEX) and operational expenses (OPEX) due to inefficient pre-provisioning.

Commonly, the services offered to end-users in different point-of-sales (e.g. shops where a terminal connectable to the telecommunications network can be acquired) comprise a combination of: basic circuit switch, CS, and/or packet switch, PS, services (e.g. which allows a user to establish from his terminal a voice communication with another terminal, and/or establish a data connection with another terminal or with a server on the Internet), network implemented services based on e.g. CAMEL ("Customised Application for Mobile network Enhanced Logic"), and, in most of the cases, also some applications services provided by application servers cooperating with network nodes, such as positioning based services, messaging services allowing the delivery of e.g. SMSs, e-mails, etc.

The set of data held by nodes of a telecommunications network for providing and/or adapting services to a given terminal connectable to the network is usually known, and also referred to herein, as "service profile" or "service profile data" or "profile data". Commonly, each terminal connectable to a telecommunications network is assigned to a "service profile", which is stored by the network (e.g. within a HLR or HSS as a master storage) in relationship with an identifier of said terminal (e.g. IMSI, MSISDN, etc), and at least a part of it also stored by the terminal.

Before a user or device is able to gain access to the services of a network, the user or device must previously have been "provisioned" in the network, with subscriber and related service data being registered in central databases such as the Home Subscriber Server (HSS) and Subscription Locator Function (SLF).

Given that normally it is difficult for the network operator to know when the end user terminal is to be acquired in a point-of-sales, and the corresponding user's related services subsequently activated, the network nodes as well application servers are usually pre-provisioned in advance with service profile data for each terminal (i.e. in relationship with identifier/s of said terminals) long before the corresponding terminal activation takes place.

This is a handicap for the operator, as it has to pre-provision its network nodes (e.g. HLRs, HSSs, charging nodes, etc) a long time before the services related to an identity of a terminal (e.g. its IMSI, its MSISDN, etc) are used. It might even happen that a given pre-provisioned service in relationship with an identity of a user terminal is never used (e.g. because the user finally acquiring a terminal does not want to user packed switch based services). This leads to a waste of network resources, which in turn leads to wasted CAPEX and OPEX. For example, since the precise instant a user terminal would perform the initial attach for a subscription is uncertain, all the sold (or waiting to be sold) subscription related data for said terminal must be pre-provisioned in the HLR/HSS/AuC, which lead to an inefficient use of HLR/HSS capacity.

To be able to overcome these problems, different functions focused in avoiding pre-provisioning of core network nodes in advance to terminal activation have been developed, allowing that the provisioning of these nodes only occurs when it is needed; for example, when the end-user terminal first attaches to the telecom network. These mechanisms are commonly known as auto-provisioning mechanisms. Details of these mechanisms are described below.

These automated provisioning mechanisms fit well when the terminals to be sold (and, subsequently, activated) are the so called Machine-to-Machine (M2M) devices (also referred herein as M2M equipments, "M2ME").

M2M devices are terminal equipments which can be arranged to connect to current telecommunications networks (e.g. 2G or 3G networks), but which are not intended to be operated by human users for originating or terminating communications (i.e. the traditional end user terminals). Instead, M2M devices are arranged to be self-operated to, for example, transmit automatically a measured parameter (e.g.: temperature, humidity, speed, etc) to a specific server in the network; for example, at certain intervals, or when a measured parameter exceeds a given threshold. Circuit Switch (CS) and/or Packed Switch (PS) bearer connection services can be used by M2M devices to transmit their data, as well as to receive data. Accordingly, configuring a M2M device with the necessary data to connect to a specific server in the network where to send its data can be a part of the provisioning tasks.

M2M deployments involve scenarios comprising: M2M manufacturers, companies acquiring M2M devices, and telecom network operators that can use its own (or roaming agreed) infrastructure to provide communication services also to the M2M devices. The number of M2M devices that can be put into operation to communicate through current telecommunications networks is expected to increase drastically in the coming years.

Taking into account the specific M2M characteristics, it is envisaged that a huge number of M2M devices can be manufactured (e.g. adapted to measure a temperature, and to transmit data related to it) and preconfigured with certain data for its operation; namely: before they are acquired by a certain company that can benefit from the data transmitted from the M2M devices, before said company acquires subscriptions with a network operator operating a telecom network allowing communications from/to these M2M devices and servers in the network, and before these devices are finally put into operation so as to be able to attach to said telecom network and to subsequently transmit and/or receive the necessary data. Nevertheless, performing said kind of pre-configuration in advance can result in an increase of M2M device production costs, and/or in lack of adaptation of M2M devices for all the eventual companies that might acquire them; being that the reason why auto-provisioning is preferably used for configuring certain operational data into M2M devices.

However, the present applicant has appreciated that, in all the existing solutions today for auto-provisioning, both: the mechanism to select the final node(s) that will host the final provisioned data for a given end-user terminal or M2M device (e.g. a HLR, HSS, etc), and the mechanism to select the data to be provisioned (i.e. downloaded) to said end-user terminal or M2M device, are static since they are based on the identifier(s) associated to the end-user terminal or M2M device, which conditions the nodes hosting the data to be provisioned, as well as the data to be provisioned (e.g. profile data are statically related to identifiers of terminals and M2M devices).

To illustrate this, previously-considered approaches to auto-provisioning will now be described.

A generic auto-provisioning scenario will first be described with reference to FIG. 1 of the accompanying drawings. The signaling flows illustrated in FIG. 1 show some basic interactions for auto-provisioning that would happen in a generic telecommunications network. It describes how the necessary data for operating a terminal (i.e. a traditional end user terminal, or a M2M terminal can be provisioned within telecom network nodes (generally represented below as "access network) in an automated manner (i.e. without requiring operator's O&M staff intervention) upon detecting the device first attach into the network (i.e. a traditional end user terminal, or a M2M terminal).

The steps in such a generic auto-provisioning scenario are given below, with reference to FIG. 1.

(0) Prior to step 1 shown in FIG. 1, a terminal (e.g. M2M device or M2ME) is provisioned with a minimum profile to be able to access the network with very restricted services.

(1) The M2M device accesses the network for the first time using its pre-provisioned minimum profile.

(2) The access network allows the access with the predefined minimum profile and notifies the provisioning system that a new user has attached in the network, so further provisioning is started. (Meanwhile, the user/M2M device can use the minimum set of services).

(3) In order to be able to complete the provisioning of the core network nodes, the provisioning system looks for the subscription data to provide for the involved M2M Device. It is important to note that these data are static data pre-stored in a database in relationship with identifier (s) of the M2M device, which is/are received by the network in the previous flows.

(4) The provisioning system builds or selects the profile to assign to the M2M device/end-user in each core network node.

(5) The Network node(s) is (are) provisioned accordingly. The M2M device is also provisioned with data according to the services included in the definitive/final profile assigned to the M2M device.

(6) The M2M device can access to the new services provided to it.

Service profile auto-provisioning in HLR will now be described with reference to FIG. 2 of the accompanying drawings. This part illustrates details of an auto-provisioning flow as described above when the telecommunications network comprises a home subscriber server, such as a HLR/AUC or a HSS.

The steps in a typical service profile auto-provisioning scenario are given below, with reference to FIG. 2.

(0) AUC is provisioned with authentication data for the M2M device. GPRS access is configured in the HLR for certain number series (that includes this M2M device).

(1) The M2M device accesses the network using its minimum profile with only GPRS access. This involves sub-steps 1.a to 1.g as summarised in FIG. 2.

(2) The HLR notifies the provisioning system so further provisioning is started. (Meanwhile, the M2M device can use the minimum set of services).

(3) Provisioning system gets static input data from a database, which were stored beforehand in relationship with identifier(s) of the currently attaching M2M device.

(4) Provisioning system conforms/builds/selects the profile.

(5) The HLR is provisioned.

(6) Other Network nodes are provisioned accordingly.

(7) Optionally, M2M device is informed about his new profile.

(8) The M2M device can access to the new services provided to him.

Remote subscription management specific for M2M devices (Selection of Operator or Hosting node) will now be described with reference to FIG. 3 of the accompanying drawings. This part illustrates signaling flow details of an auto-provisioning flow to provisioning of MCIM data for M2M devices as described by 3GPP TR 33.812 V9.2.0 (June 2010; 3rd Generation Partnership Project; Technical Specification Group Services and System Aspects; Feasibility study on the security aspects of remote provisioning and change of subscription for Machine to Machine (M2M) equipment) in section 5.1.3.6.3 and its FIG. 5.1.3.6.3-1 (included as FIG. 3 of the accompanying drawings).

The acronym MCIM stands for "Machine Communication Identity Module". In short, it comprises a collection of data and executable software for—among other functions— identifying the corresponding M2M device and for running authentication procedures before the telecom network. Thus, to some extent a MCIM application is equivalent to "Subscriber Identity Module" applications (such as SIM, USIM or ISIM applications) commonly residing in a "Universal Integrated Circuit Card", UICC, connectable to traditional 2G/3G mobile user terminals. (USIM is Universal Subscriber Identity Module; DLUSIM is a Downloadable USIM.)

The MCIM data that are downloaded to a M2M device at this stage (as illustrated in the figure below) can comprise connectivity service data, which can then be used by the M2M device in further communications to establish a connection through the telecom network with the specific application server where to send its data (e.g. measured temperature, humidity, speed, etc).

The scenario, with regard to a 3G telecommunications system comprising a complex multi-network operator scenario having: a Visited Network Operator (VNO), which is accessed from the M2M device for getting access to the 3GPP system; a Registration Operator (RO), which, in cooperation with the VNO, allows the registration of the M2M device within the 3GPP system; and a Selected Home Operator (SHO) to which the M2M device is intended to be subscribed, and which, in cooperation with the RO, allows the provisioning of the M2M device when initially attaches to the 3GPP network. However, in some real-life situations, the (complex) access and provisioning scenario illustrated below by FIG. 3 can be simpler, and e.g. the VNO and the RO can be the same physical network operator.

The meaning of the acronyms and specific terms cited in FIG. 3 and by the accompanying description, as well as the description of some functional entities referred herein, are disclosed in detail by the aforementioned document 3GPP TR 33.812, and/or within its cited references. However a brief explanation of them is provided below.

The items "VNO", "RO" and "SHO" in the figure below represent in a simplified and grouped manner, nodes in the different network domains of said operators (i.e., respectively: Visited Network Operator, Registration Operator and Selected Home Operator.

In particular, the domain of the RO can comprise one or more nodes implementing the following functional entities:

Initial Connectivity Function (ICF). It is a functional entity for providing initial connectivity for the M2M equipment to request downloading and provisioning of data (e.g. final credentials, application data, etc.) to the M2M equipment.

Discovery and Registration Function (DRF). It is a functional entity for allowing a M2M equipment to discover and register with the corresponding SHO.

Download and Provisioning Function (DPF). It is a functional entity for managing the downloading and provisioning of data (e.g. final credentials, application data, etc) to the M2M equipment in cooperation with nodes of the SHO.

In turn, the domain of the SHO can comprise, or have access to, a:

Platform Validation Authority (PVA). It is a functional entity for validating the credentials used to verify a M2M equipment as a trusted platform allowed to access the telecommunications network.

In some cases, the role of the PVA and the DPF may be hosted by nodes within the SHO.

The steps below describe (with reference to FIG. 3) signaling flow details of an auto-provisioning flow to provisioning of MCIM data for M2M devices as described by 3GPP TR 33.812 V9.2.0.

Steps 1 to 5 describe the phase of initial attach of a M2M device using its pre-provisioned provisional credentials and its pre-provisioned provisional service profile data for achieving an initial connectivity.

(1) The M2ME uses the standard GSM/UMTS functions (GPRS/PS) to decode network information and attaches to the network of any VNO. In the attach message the M2ME sends a Provisional Connectivity ID (PCID) to the VNO. To avoid that the VNO needs to support special M2M functionality, the PCID has the same format as the IMSI. The "MCC" and "MNC" fields in the PCID will indicate to the VNO which entity it should contact to obtain authentication vectors to authenticate the PCID with.

(2) The VNO contacts the RO (ICF function) and sends the PCID-IMSI to the ICF. Note that in some cases the RO and VNO may be the same operator.

(3) Upon receiving the PCID-IMSI, the ICF queries the temporary-access credential associated with the PCID in its database. According to the credential, the ICF can generate AVs.

NOTE 1: If the ICF is not already in possession of the used PCID-IMSI and related temporary-access credential, it can obtain it from the CCIF.

(4) The RO transfers AVs for the claimed PCID-IMSI to the VNO.

(5) The VNO uses the AV to authenticate the M2ME through the AKA.

Steps 6 to 10 describe the phase of discovery and registration.

(6) The ICF request the DRF to bootstrap. Internally, the RO forwards the PCID and the IP address of the M2ME from its ICF to its DRF function.

(7) According to the PCID-IMSI, the DRF queries the address of the DPF and the SHO which has contract with the M2ME in its database. It is important to note that this is a static procedure, since the SHO/DPF for this M2M device is pre-provisioned in DRF database in relationship with identifier(s) of said device, which is/are obtained in these signaling flows. Then it generates the Bootstrap message.

(8) The DRF sends the Bootstrap message to the M2ME. In the message it includes the IP connectivity parameters (NAPDEF), the address of the DPF (Server URL), the context of the MCIM application provision and the context of the M2M application provision. If the provided PCID-IMSI already points to the RO, the RO could become the SHO, and then the IMSI is just continued to be used.

(9) Triggered by the Bootstrap message, the M2ME contacts the DPF and includes relevant information of the M2ME and the TRE (e.g. platform validation info). TRE is "Trusted environment", a functional area within a M2M device arranged to store, among other, MCIM data.

(10) The RO (DPF function) connects to the SHO, and relays the M2ME/TRE info there. Note that this is a static procedure, since, as mentioned earlier for step 7, the SHO corresponding to a certain M2M device identifier is pre-provisioned in DPF database or received from DRF.

Steps 11 to 19 describe the phase of MCIM application provision to the M2M device, which includes downloading to it, among other, the final (i.e. definitive) credentials, as well as other service profile data, which are to be used thereinafter by the M2M device.

(11) The SHO sends the validation info signed by the PfC and TRE identity to a PVA and requests a PVA to validate the authenticity and integrity of the TRE.

(12) The PVA locally validates the authenticity and integrity of the M2ME, according to the requirements of the SHO.

(13) The PVA sends the validation results back to the SHO, according to the SHO requirements.

(14) The SHO encrypt the MCIM by using the PfC and generate the management object for M2M (e.g MCIMobj).

(15) The SHO delivers the encrypted MCIM (e.g. within MCIMobj) to the RO (DPF) and authorizes provisioning of the MCIM application to the M2ME.

(16) The RO (DPF) downloads a MCIM object to the M2ME.

(17) The M2ME provisions the downloaded MCIM into the TRE. The TRE decrypts MCIMobj by using the TRE Platform Key to obtain the MCIM.

(18) The M2ME reports the success/failure status of the provisioning to the RO (DPF).

(19) The RO (DPF) reports the success/failure status of the provisioning back to the SHO The present applicant has appreciated several issues with the existing solutions.

As mentioned earlier, the solutions that exist today for auto-provisioning are limited due to the lack of flexibility they show to select, both: the final node that will host the final provisioned data for a terminal (e.g. traditional end-user terminal or M2M device), as well as the data to be provisioned to said terminal. The current static auto-provisioning mechanisms (i.e. based on the identifier/s provided by the terminal when attaching to the network) can fit well for traditional end-user terminals; however, they might not suit so well for automated provisioning of M2M devices. As commented above, as opposed to terminal equipments intended for being controlled by human users (such as typical mobile phones) wherein the human user operating the terminal decides, on a case by case basis, the destination equipment for a communication (e.g. other terminal, or a given application server hosting a service, such as a web browsing service), the so called M2M devices are intended to establish communications in an automated manner with only certain destination equipments, which commonly is an application server arranged to collect and process measured temperatures from certain M2M devices. This implies configuring each and every M2M device with the necessary connectivity service data that, once these devices are connected to a telecommunications network, will allow them to individually establishing their respective communications through said network for communicating with the specific servers where to send their respective data.

The connectivity service data mentioned above can comprise, for example: an identifier of a service center for SMSs, and/or an "Access Point Name, APN" for PS based services via GPRS, and/or a "Uniform Resource Locator, URL" usable to address a certain application server, and/or an IP address of a certain application server. For most of the terminal equipments intended for being controlled by human users, these data can be controlled by the human user on a per individual communication basis. However, as cited above, that is not the case for M2M devices.

Configuring data (e.g. connectivity related data, as cited above) within M2M devices before they are finally acquired and put into operation (e.g. before a set of M2M devices are acquired by a company, or before said company acquire the necessary subscriptions to subscribe them to a network operator, or before these M2M devices first attach to the telecom network of a certain network operator) tends to increase the production costs for the M2M manufacturers, and/or increase acquisition and adaptation costs for the company buying them.

On the other hand, relying on prior art auto-provisioning static techniques can result in an unnecessary consumption of resources for the operators of the telecommunications networks. In particular, the databases accessed by the provisioning systems of said operators will have to store in advance, among other, connectivity data for each and every M2M device that can eventually attach to their network domains within a telecommunications network (i.e. data that should be pre-stored in relationship the respective identifier/s of each and every M2M device), so that both, a M2M device and the corresponding network node/s (e.g. HLR, HSS, etc) are provisioned accordingly when the M2M device is put into operation. These data stored in advance might however do not fit well for each and every M2M device when they are respectively put into operation and connect to a telecom network and, in any case, forces to coordinate detailed information about the intended usage of each M2M device between: M2M manufacturers and/or acquirers, and network operators.

It is desirable to address the above-identified issues.

SUMMARY

A method is proposed of provisioning connectivity service data for a device when the device attaches to a telecommunications network. The connectivity service data comprises information required to enable connectivity between the device and at least one further device of the network. Dynamic data relating to the device is obtained as part of one of the device attaching to the telecommunications network and a previous attachment of the device to the network. The dynamic data is of a type that may change from one such attachment to another such attachment of the same device. The connectivity service data is then selected based on the obtained dynamic data. The selected connectivity service data is arranged to be provisioned to the device.

An apparatus is also proposed for provisioning connectivity service data for a device when the device attaches to a telecommunications network. Again, the connectivity service data comprises information required to enable connectivity between the device and at least one further device of the network. The apparatus comprises means for obtaining (or a receiver or processor or other such unit configured to obtain) dynamic data relating to the device as part of one of the device attaching to the telecommunications network and a previous attachment of the device to the network. Again, the dynamic data is of a type that may change from one such attachment to another such attachment of the same device. The apparatus also comprises means for selecting (or a processor or other such unit configured to select) the connectivity service data based on the obtained dynamic data. The apparatus also comprises means for arranging (or a processor or other such unit configured to arrange) for the selected connectivity service data to be provisioned to the device.

The description of the dynamic data as being of a type which may change from one attachment to another attachment of the same device is intended to distinguish from previously-considered provisioning techniques that might also be argued to act "dynamically" (e.g. based on an identifier, such as based on the IMSI and/or IMEI indicated by the registering device). The term "dynamic data" used herein is not intended to equate to any identifier preconfigured in the registering device.

The method may comprise selecting, in dependence upon the obtained dynamic data, at least one node that will host at least some of the selected connectivity service data, and arranging for the at least some connectivity service data to be provisioned to the at least one node. The apparatus may comprise means for performing (or a processor or other such unit configured to perform) such a selection.

The at least some connectivity service data may form part of the profile data of the device. The step of selecting the at least one node that will host the at least some connectivity service data may be a step of selecting at least one node that will host the profile data of the device. The profile data is typically hosted within a HLR or a HSS in 2G or 3G telecommunication systems.

The dynamic data may comprise data relating to the location of the device.

The dynamic data may comprise at least one of (a) a Location Area Identification, LAI; (b) a Routing Area Identification, RAI; (c) a Cell Identity, CI; (d) a Cell Global Identification, GCI; (e) a Base Station Identify Code, BSIC; (f) a Regional Subscription Zone Identity RSZI; (g) a Location Number; (h) an MSC VLR identifier; (i) an SGSN identifier; (j) any other such information defined in sections 4 or 5 of 3GPP TS 23.003 V10.1.0; and (k) geographical/geodetic data transmitted from the device or calculated by at least one network node for the device.

The connectivity service data may comprise information enabling the device to address or at least send data to the at least one further device.

The connectivity service data may comprise at least one of (a) an IP address; (b) a port; (c) a Uniform Resource Locator, URL; (d) an "Access Point Name, APN"; and (e) an identifier of a service center.

The device may be a Machine-to-Machine, M2M, device, and at least one of the at least one further device may be either: another M2M device; or an application server collecting data transmitted from M2M devices. Perhaps the most common case is a M2M device communicating with an application server specialized in collecting and processing data received from a plurality of M2M devices.

Obtaining the dynamic data may comprise receiving it in a message which triggers provisioning of the device.

The network may comprise a 3G network.

The method or apparatus may be implemented in a provisioning system of the network.

The provisioning system may comprise, as defined in 3GPP TR 33.812, a Registration Operator, RO, wherein the Registration Operator comprises a Discovery and Registration Function, DRF, and the selecting step may be performed by the Discovery and Registration Function to select at least one of a Download and Provisioning Function, DPF, and a Selected Home Operator, SHO, as the at least one node.

A separate method is also proposed for providing the dynamic data to the provisioning system.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

An embodiment of the present invention provides a solution that comprises using a service profile selection functionality in a telecom network for selecting dynamically at least part of the data contents of the Service Profile to be downloaded to a M2M Device, and also the node(s) in the telecom network that will host the selected profile (which could also include the selection of the operative telecom network operator—Remote Subscription Management scenarios), all based on dynamic data (e.g. location information) about said M2M Device obtained by said network during the signaling due to a first, or subsequent, attachment of said M2M device to the network.

The service profile selection functionality determines dynamically, and based on obtained dynamic data (e.g. location information), at least the data to be provided to a M2M device with regard to CS and/or PS connectivity services (i.e. so called herein as "connectivity service data"), and arranges the downloading of said data to the M2M device, so that further communications initiated by the M2M device get the destination equipment (e.g. application server) arranged to collect and process its measured data.

In brief, as a result of a first or subsequent attachment to the system of a M2M device, the service profile selection functionality determines at least part of the service profile data to be provided to a given M2M device, and to the appropriate network node/s (e.g. HLR, HSS, etc), with regard (amongst others) to CS and/or PS connectivity services, based on the obtained dynamic data (e.g. location information) of the M2M device. Accordingly, further communications initiated from the M2M device will get, using the provisioned connectivity service data, the destination equipment (e.g. application server) that is intended to collect and process its transmitted data; wherein said provisioned connectivity service data were determined using as selection criteria location information about from where the device is first, or subsequently, attached to the telecom network.

The provisioned connectivity service data can comprise, amongst others, one or more of the following information elements: an identifier of a service center for SMSs, an "Access Point Name, APN" for PS based services via GPRS, an "Uniform Resource Locator, URL", or an IP address. The location information obtained as a result of a first or subsequent attachment to the telecom network of a M2M device, such as a 3G telecom network, and which are the basis for determining at least the connectivity service data to be provisioned, can comprise CS and/or PS location information of the attaching M2M device that can be obtained during the related signaling (such as e.g.: "Global Cell identifier", "Routing Area identifier", "MSC VLR identifier", "SGSN identifier", as defined by 3GPP TS 23.003 V10.1.0 in sections 4 or 5), as well as geographical/geodetic data that can be transmitted from the M2M device, or calculated by network nodes for said device.

DETAILED DESCRIPTION

Figure 1:
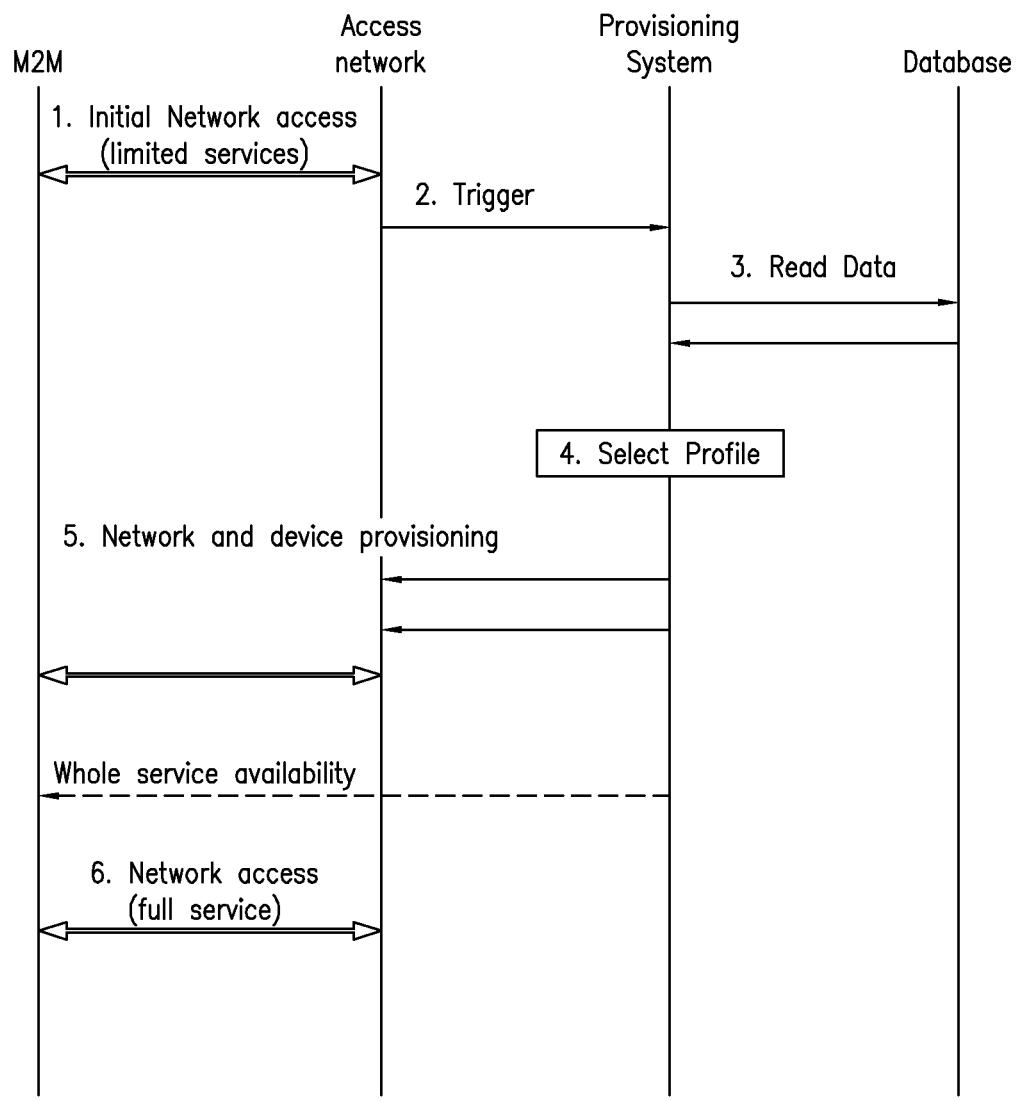
FIG. 1, discussed hereinbefore, illustrates schematically the steps in a generic auto-provisioning scenario.
Figure 2:
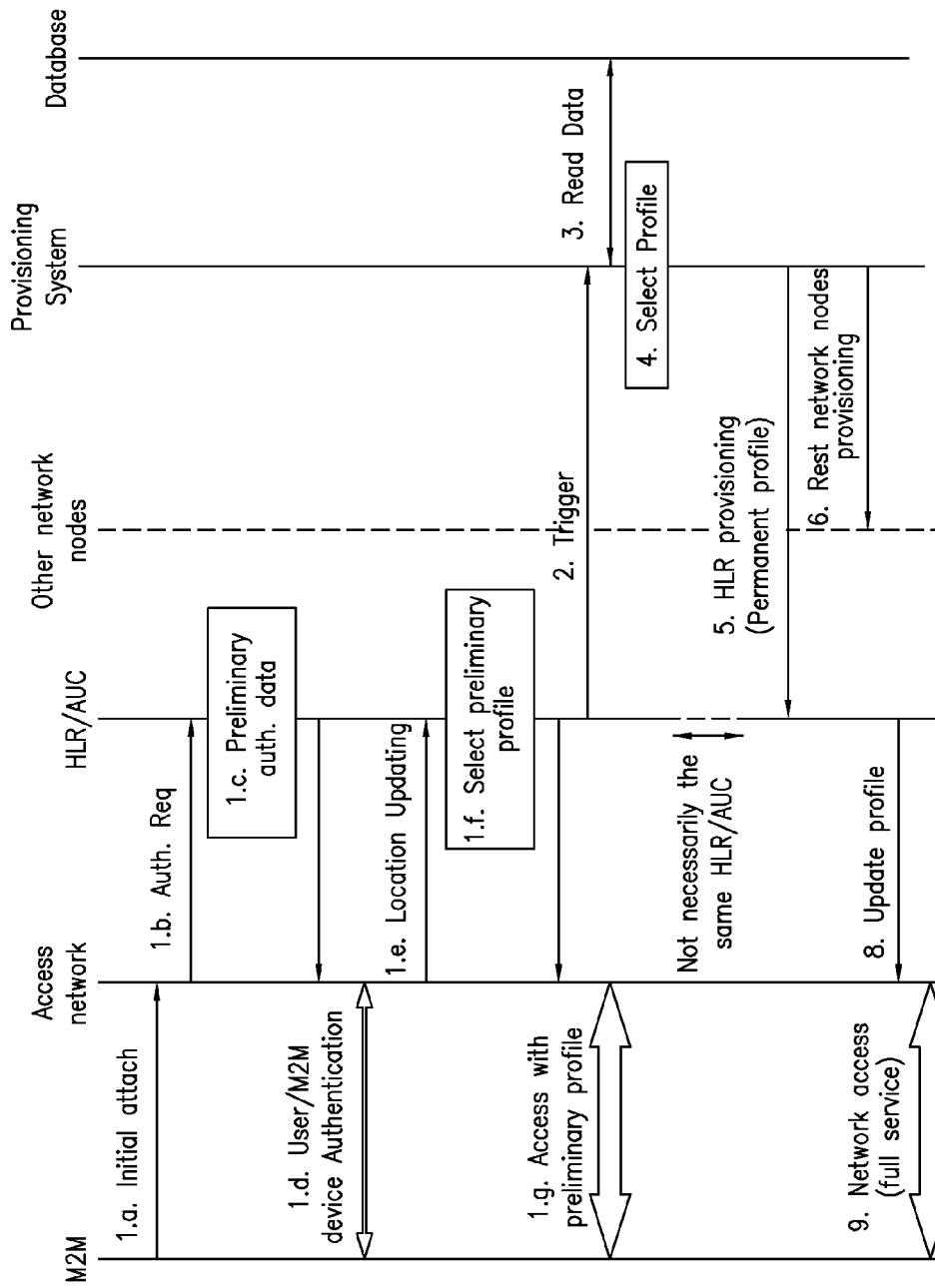
FIG. 2, discussed hereinbefore, illustrates schematically the steps in typical service profile auto-provisioning scenario.
Figure 3:
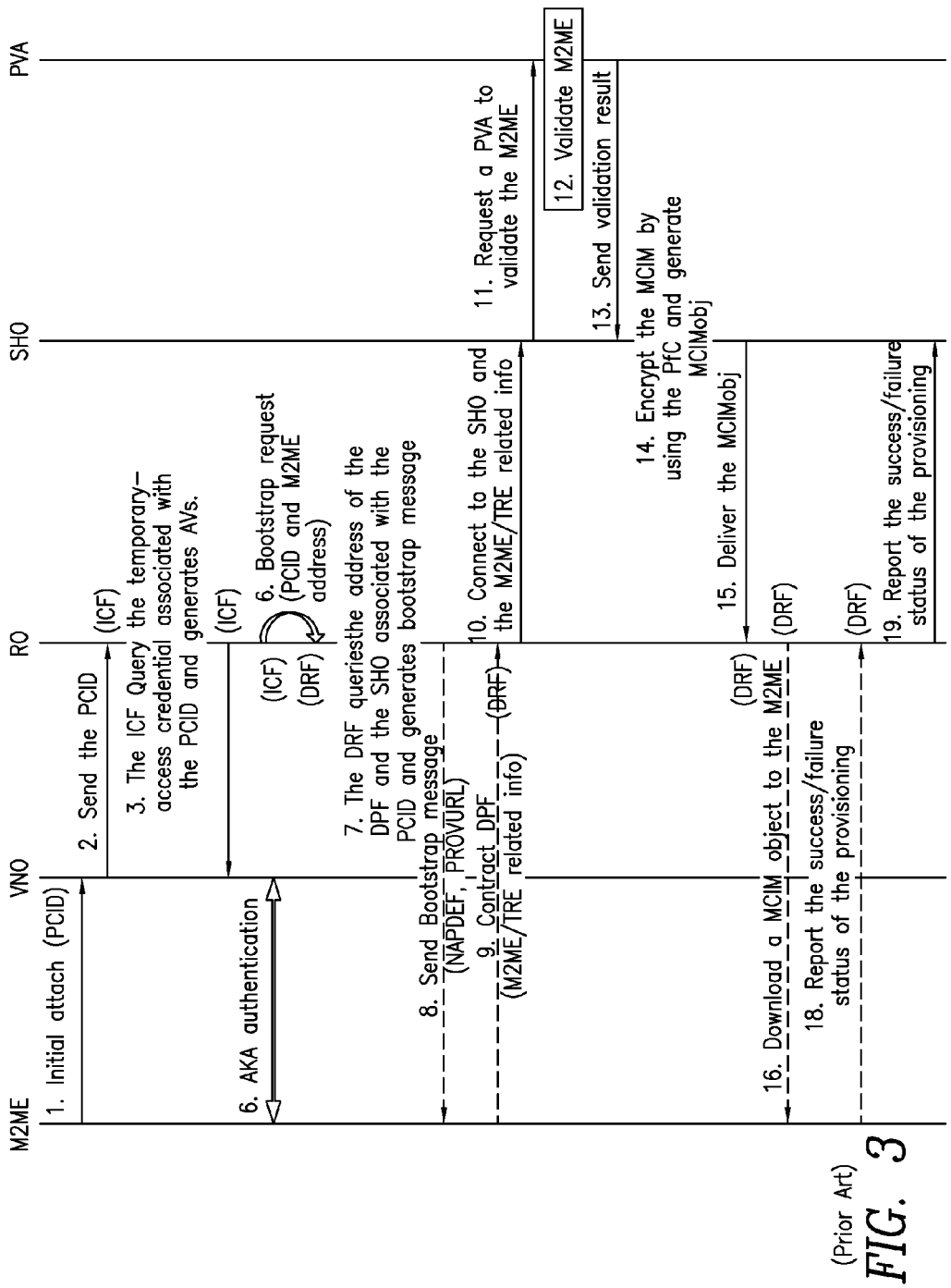
FIG. 3, discussed hereinbefore, illustrates schematically the steps of an auto-provisioning flow for provisioning of MCIM data for M2M devices as described by 3GPP TR 33.812 V9.2.0.
Figure 4:
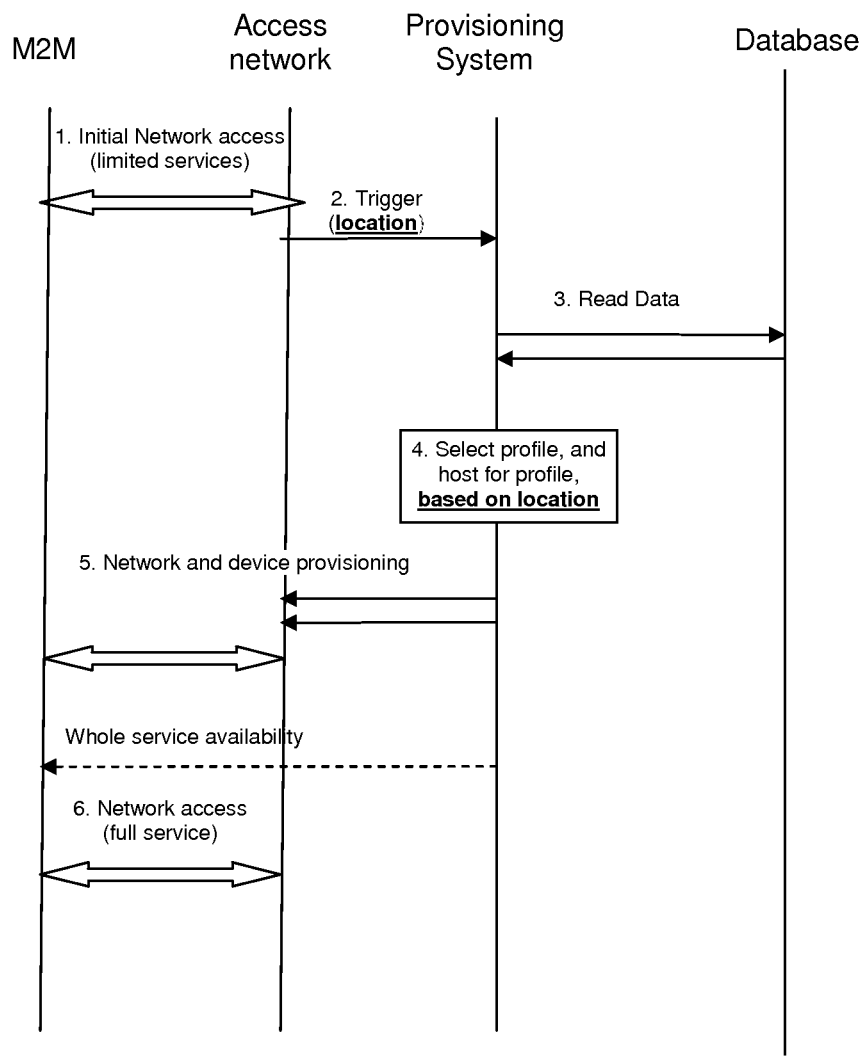
FIG. 4 illustrates schematically the steps of a generic auto-provisioning scenario according to an embodiment of the invention.

An embodiment of the present invention will first be described in general terms, with reference to FIGS. 7 and 8, followed by a description with reference to FIGS. 4 to 6 of how an embodiment of the present invention can be applied in a more specific scenario equivalent to that described above with reference to FIGS. 1 to 3.

A method according to an embodiment of the present invention can be considered to be a method of provisioning connectivity service data for a device 10 when the device 10 attaches to a telecommunications network, for example via an access domain 20.

The connectivity service data comprises information required to enable connectivity between the device 10 and at least one further device (not shown) of the network. Such a method is illustrated schematically in FIG. 7, and apparatus for performing the method is illustrated schematically in FIG. 8. In this example, a significant part of the method (steps S4 to S7) and apparatus (32, itself comprising units P4 to P7) is implemented in a provisioning system 30 of the network.

Dynamic data relating to the device is obtained as part of the or a previous attachment of the device to the network. This is illustrated by steps S1 to S4 of FIG. 7. In step S1, the device 10 performs an attach procedure with the access domain 20, and as part of this attach procedure in step S2 the access domain obtains the dynamic data referred to above. The dynamic data is of a type which may change from one such attachment to another such attachment of the same device. Access apparatus 22 in the access domain 20 comprises a unit P2 which is configured to obtain the dynamic data in this way. In step S3 the dynamic data is sent to the provisioning system 30, and this dynamic data is received (obtained) by the provisioning system in step S4. Access apparatus 22 comprises a unit P3 which is configured to send the dynamic data in this way to the provisioning system 30, while provisioning apparatus 32 in the provisioning system 30 comprises a unit P4 which is configured to receive (obtain) this dynamic data. Steps S2 and S3 can be considered to be a self-contained method for providing the dynamic data to the provisioning system 30.

In step S5, the connectivity service data referred to above is selected in dependence upon the dynamic data received (obtained) in step S4; this step is performed by a unit P5 in the provisioning apparatus 32.

In this example, in step S6 at least one node is also selected, in dependence upon the received (obtained) dynamic data, that will host at least some of the selected connectivity service data; this step is performed by a unit P6 in the provisioning apparatus 32. The at least one node may of course be selected by some other means. The at least some connectivity service data may form part of the "profile data" of the device, which is typically hosted within a HLR or a HSS in 2G or 3G telecommunication systems (so that the at least one node may be a HLR or HSS). The step of selecting the at least one node that will host the at least some connectivity service data may therefore be considered be a step of selecting at least one node that will host the "profile data" of the device.

It is then arranged, in step S7, for the connectivity service data selected in step S5 to be provisioned to the device. In this example, it is also arranged as part of step S7 for the at least some connectivity service data (referred to above with reference to step S6) to be provisioned to the at least one node selected in step S6.

The connectivity service data may comprise information enabling the device 10 to address or at least send data to the at least one further device. In this respect, the connectivity service data may comprise at least one of (a) an IP address; (b) a port; (c) a Uniform Resource Locator, URL; (d) an "Access Point Name, APN"; and (e) an identifier of a service center. The network may comprise a 3G network.

As is the case in the specific scenarios to be described below with reference to FIGS. 4 to 6, the device may be a Machine-to-Machine, M2M, device. At least one of the at least one further device may be another M2M device, or perhaps more commonly an application server specialised in collecting and processing data transmitted from M2M devices.

As illustrated at least in the examples of FIGS. 4 and 6 below, obtaining the dynamic data may comprise receiving it in a message which triggers provisioning of the device.

As illustrated at least in the example of FIG. 5 below, the provisioning system may comprise, as defined in 3GPP TR 33.812, a Registration Operator, RO, wherein the Registration Operator comprises a Discovery and Registration Function, DRF, and the selecting step may be performed by the Discovery and Registration Function to select at least one of a Download and Provisioning Function, DPF, and a Selected Home Operator, SHO, as the at least one node.

As illustrated in each of the examples of FIGS. 4 to 6 below, the dynamic data may comprise data relating to the location of the device. For example, the dynamic data may comprise at least one of (a) a Location Area Identification, LAI; (b) a Routing Area Identification, RAI; (c) a Cell Identity, CI; (d) a Cell Global Identification, GCI; (e) a Base Station Identify Code, BSIC; (f) a Regional Subscription Zone Identity RSZI; (g) a Location Number; (h) an MSC VLR identifier; (i) an SGSN identifier; (j) any other such information defined in sections 4 or 5 of 3GPP TS 23.003 V10.1.0; and (k) geographical/geodetic data transmitted from the device or calculated by at least one network node for the device.

The decisions made based on the obtained location information of an M2M device, which are illustrated in the examples described below with reference to FIGS. 4 to 6, and which allow selecting based on said information dynamically, both: at least part of the contents of the service profile data to be downloaded to a M2M Device with regard to connectivity service data, and the node(s) in the telecom network that will host data of said selected profile; can be based on data tables relating: location information that can be obtained from attachment procedures from M2M devices, and information about the corresponding connectivity service data and said nodes. An illustrative example of said data tables is shown in the table below.

| Obtained location information | Profile/Connectivity service data | Selected network node(s) for storing profile data |
| --- | --- | --- |
| L1 | APN=telco-operator-x.de; 150.105.25.25:622020 | HSS-2-operator-x |
| L2 | ftp://company-a.it | HSS-5-operator-x |
| L3 | APN=telco-operator-z.es; http://mms/operator-z | HSS-3-operator-z |
| L4 | SMS service center=+34609090909 | HLR-2-operator-y |
| — | — | — |
| Lm | 192.105.25.25 | HSS-1-operator-x |

The following are notes relating to each of the above entries:
(L1) The M2M device is provided with connectivity service data, so that for transmitting its data, it will have to establish a data connection, via the APN "telco-operator-x.de", with the port number 622020 of the server corresponding to the IP address 150.105.25.25.
(L2) The M2M device is provided with connectivity service data, so that for transmitting its data, it will have to establish a file transport protocol, FTP, connection (e.g. via any available APN) with the server named with the URL "company-a.it".
(L3) The M2M device is provided with connectivity service data, so that for transmitting its data, it will have to establish a data connection according to HTTP protocol, via the APN "telco-operator-z.es", with the server serving the HTTP URI "mms/operator-z" (e.g. a multimedia messaging sever).
(L4) The M2M device is provided with connectivity service data, so that for transmitting its data, it will have to establish a communication with the SMS service center identified with the MSISDN number +34609090909.
(Lm) The M2M device is provided with connectivity service data, so that for transmitting its data it will have to establish a data connection (e.g. via any available APN) with the server corresponding to the IP address 192.105.25.25.

The nodes in the telecom network that will host the service profile can be selected, for example, in the following way:

First: Selection of the Operational telecom network operator. This step is only required in case of Remote Subscription Management scenarios. At first attach, at MCIM credentials configuration in the M2M device during the 'Remote Subscription Management' procedure, the initial connectivity infrastructure of e.g. the Registration Operator (RO) of the FIG. 5 below (which is based on previous FIG. 3) determines which SHO will operate the M2M device basing its decision on location information related to the M2M device. This is the option illustrated below with reference to FIG. 5.

Second: At subsequent attaches (in case of 'Remote Subscription Management' procedures) or first attach (the usual case), the network operator, making use of service profile auto-provisioning features implemented today by network nodes, determines the final host that will hold the service profile data related to this M2M device basing its decision on location information related to the M2M device.

One possible application of an embodiment of the present invention to a generic auto-provisioning scenario will now be described with reference to FIG. 4. FIG. 4 is based on previous FIG. 1, and illustrates schematically the steps of a generic auto-provisioning scenario according to an embodiment of the invention, highlighting the changes introduced by features of the invention.

The steps of a generic auto-provisioning scenario according to an embodiment of the invention are described below, with reference to FIG. 4. Some distinguishing features of the embodiment are shown in bold below.

(0) The M2M device is provisioned with a minimum profile to be able to access the network with very restricted services.
(1) The M2M device accesses the network using its minimum profile.
(2) The access network gives these minimum services and notifies the provisioning system so further provisioning is started. Dynamic data such as M2M Device Location information is sent in the trigger.
(3) The provisioning system reads data in a database.
(4) The provisioning system selects the profile data to be assigned to the M2M device, and the network node(s) to be correspondingly provisioned, taking as input the data from the database and the dynamic data relating to the M2M device location.
(5) The corresponding network node(s) and the device are provisioned accordingly.
(6) The M2M device can access the new services provided to it.

One possible application of an embodiment of the present invention to remote subscription management specific for M2M devices (Selection of Operator or Hosting node) will now be described with reference to FIG. 5. FIG. 5 is based on previous FIG. 3, and illustrates schematically the steps of remote subscription management specific to M2M devices according to an embodiment of the invention, and highlights the changes introduced by features according to an embodiment of the invention.

Instead of having the operator or the hosting node pre-provisioned in the RO, this invention proposes to dynamically assign it based on device location. So, the Selected Home operator could be for example a local operator where the device is roaming.

This would be a big advantage for multinational operators that could have a contract with an RO for all their devices and choose their local operator credentials at the first attach of the device.

Figure 5:
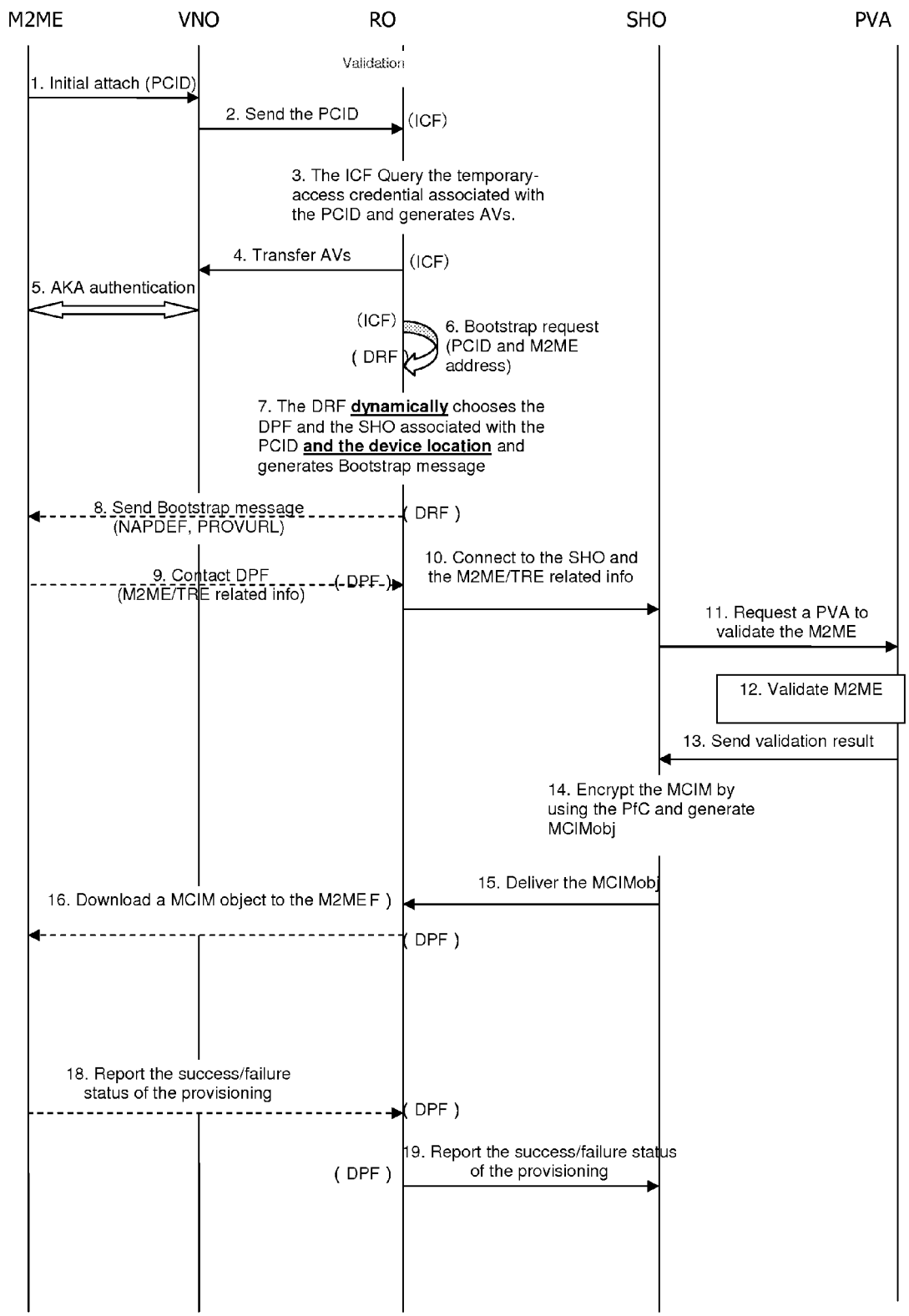
FIG. 5 illustrates schematically the steps of remote subscription management specific to M2M devices according to an embodiment of the invention.

The signaling flow illustrated in FIG. 5 (based on previous FIG. 3) illustrates the use case.

Steps 1 to 5 describe the phase of initial attach of a M2M device using its pre-provisioned provisional credentials and its pre-provisioned provisional service profile data for achieving an initial connectivity.

1. The M2ME uses the standard GSM/UMTS functions (GPRS/PS) to decode network information and attaches to the network of any VNO. In the attach message the M2ME sends a Provisional Connectivity ID (PCID) to the VNO. To avoid that the VNO needs to support special M2M functionality, the PCID has the same format as the IMSI. The "MCC" and "MNC" fields in the PCID will indicate to the VNO which entity it should contact to obtain authentication vectors to authenticate the PCID with.
2. The VNO contacts the RO (ICF function) and sends the PCID-IMSI to the ICF. Note that in some cases the RO and VNO may be the same operator.
3. Upon receiving the PCID-IMSI, the ICF queries the temporary-access credential associated with the PCID in its database. According to the credential, the ICF can generate AVs.
   NOTE 1: If the ICF is not already in possession of the used PCID-IMSI and related temporary-access credential, it can obtain it from the CCIF.
4. The RO transfers AVs for the claimed PCID-IMSI to the VNO.
5. The VNO uses the AV to authenticate the M2ME through the AKA.

Steps 6 to 10 describe the phase of discovery and registration.

6. The ICF request the DRF to bootstrap. Internally, the RO forwards the PCID and the IP address of the M2ME from its ICF to its DRF function.
7. According to the PCID-IMSI, and according to the obtained M2M device location information the DRF dynamically selects the address of the DPF and the SHO which has contract with the M2ME for the device location (dynamic procedure). Then it generates the Bootstrap message.
8. The DRF sends the Bootstrap message to the M2ME. In the message it includes the IP connectivity parameters (NAPDEF), the address of the DPF (Server URL), the context of the MCIM application provision and the context of the M2M application provision. If the provided PCID-IMSI already points to the RO, the RO could become the SHO, and then the IMSI is just continued to be used.
9. Triggered by the Bootstrap message, the M2ME contacts the DPF and includes relevant information of the M2ME and the TRE (e.g. platform validation info)
10. The RO (DPF function) connects to the SHO (previously dynamically selected in the DRF, or dynamically selected by the DPF based on the M2M device location information), and relays the M2ME/TRE information there.

Steps 11 to 19 describe the phase of MCIM application provision to the M2M device, which includes downloading to it, among other, the final (i.e. definitive) credentials, as well as other service profile data, which are to be used thereinafter by the M2M device.

11. The SHO sends the validation info signed by the PfC and TRE identity to a PVA and requests a PVA to validate the authenticity and integrity of the TRE.
12. The PVA locally validates the authenticity and integrity of the M2ME, according to the requirements of the SHO.
13. The PVA sends the validation results back to the SHO, according to the SHO requirements.
14. The SHO encrypt the MCIM by using the PfC and generate the management object for M2M (e.g MCIMobj).
15. The SHO delivers the encrypted MCIM (e.g. within MCIMobj) to the RO (DPF) and authorizes provisioning of the MCIM application to the M2ME.

16. The RO (DPF) downloads a MCIM data object to the M2ME. The downloaded MCIM data object can also comprise, among other, connectivity service data, which are usable thereafter by the M2M device to establish any further communication, and which were selected according to the location of the M2ME.
17. The M2ME provisions the downloaded MCIM into the TRE (step not shown in the figure). The TRE decrypts MCIMobj by using the TRE Platform Key to obtain the MCIM downloaded data.
18. The M2ME reports the success/failure status of the provisioning to the RO (DPF).
19. The RO (DPF) reports the success/failure status of the provisioning back to the SHO.

Steps 11 to 19 describe the phase of MCIM application provision.

The flow where a profile is dynamically selected to a M2M Device based on Device location will now be described.

Figure 6:
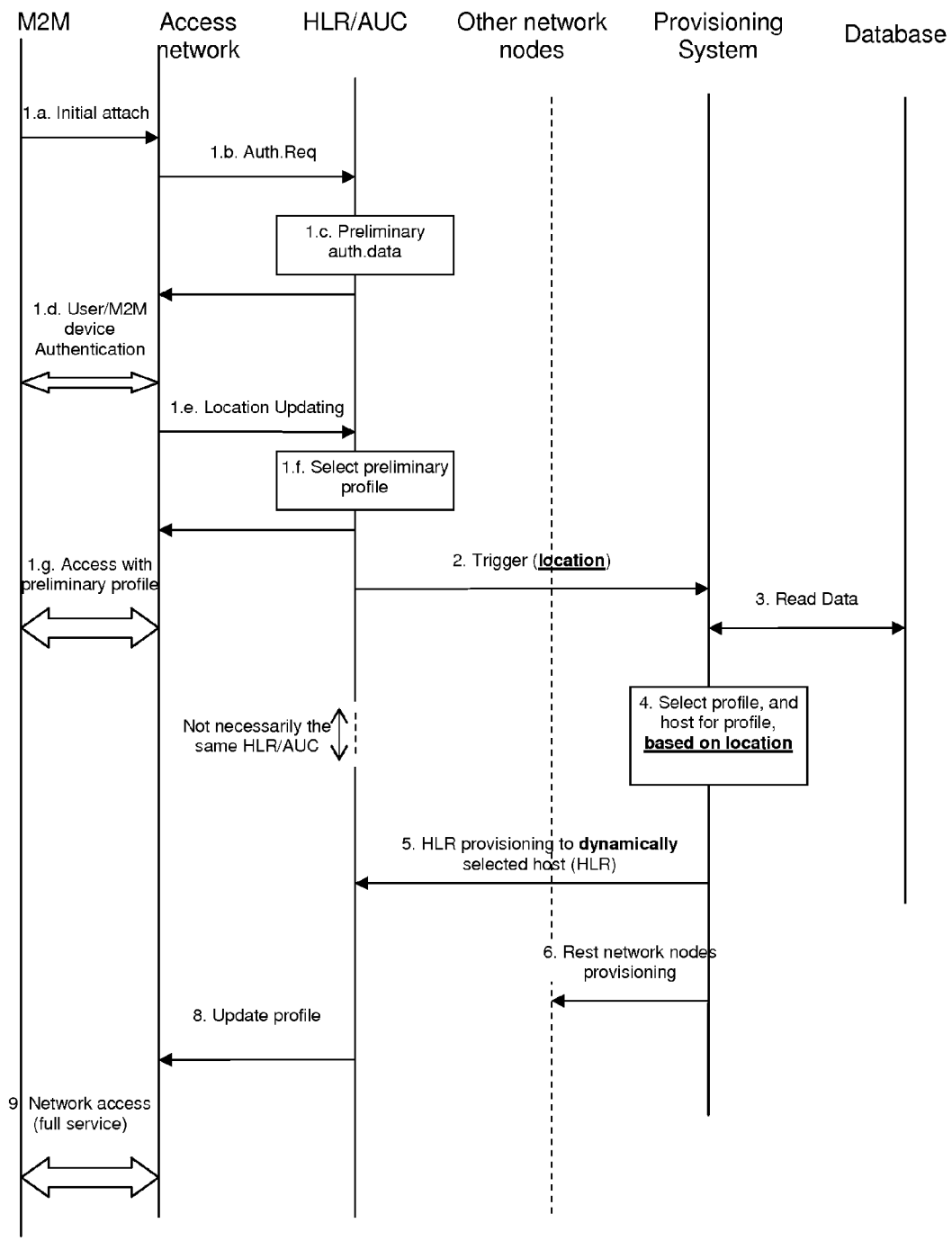
FIG. 6 illustrates schematically the steps when a profile is dynamically selected to a M2M Device based on Device location.
Figure 7:
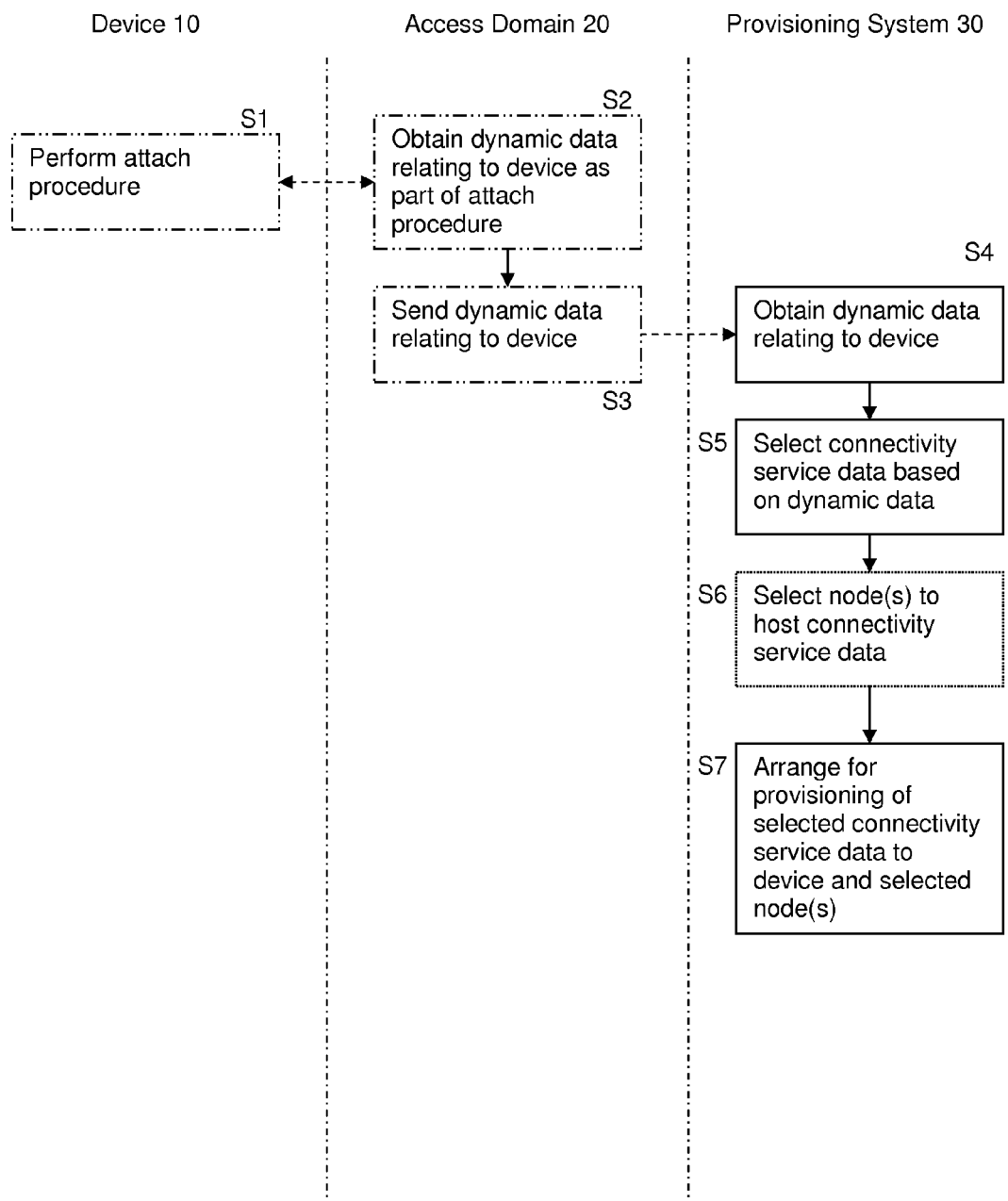
FIG. 7 is a schematic flow chart illustrating a method performed by nodes in an embodiment of the present invention.

FIG. 6 highlights the changes introduced to the process by features according to an embodiment of the invention.

The steps of a flow according to an embodiment of the invention where a profile is dynamically selected to a M2M Device based on Device location are described below, with reference to FIG. 6. Some distinguishing features of the embodiment are shown in bold below.

(0) AUC is provisioned with authentication data for the M2M device. GPRS access is configured in HLR for certain number series (that include this M2M device).
(1) M2M device accesses the network using its minimum profile with only GPRS access. This involves sub-steps 1.a to 1.g as summarised in FIG. 6.
(2) The initially addressed HLR notifies the provisioning system so further provisioning is started. Dynamic data such as M2M Device Location information is sent in the trigger.
(3) Provisioning system obtains the data from the database.
(4) The provisioning system selects the profile data to be assigned to the M2M device, and the network node(s) to be correspondingly provisioned, taking as input the data from database and the dynamic data relating to the M2M device location. The profile data might include data dependent on the location of the M2M device, such as identifiers of e.g. the nearest application server to which the M2M device should establish further communications, APNs that should be used by the M2M device when establishing further data communications, SMS/MMS service center identifiers to be subsequently used by the M2M device, etc.
(5) The corresponding HLR, selected according to M2M device location information, is provisioned with the corresponding profile data of the M2M device (FIG. 6 illustrates the same initially addressed HLR just for simplicity).
  In these figures the node (i.e. HLR/AUC) involved in steps 1.b to 1.f appears, for the sake of simplicity, to be the same as the one involved in step 5 and subsequent steps. However, it will be appreciated that step 4 includes the selection of the node that will finally host the profile of the attaching device. For simplicity, the same node (HLR/AUC) appears illustrated as being involved in steps 1.b to 1.f and also in step 5 and subsequent; however, the node (HLR/AUC) involved in step 5 and subsequent steps is actually the one dynamically selected according to dynamic data relating to the attaching device.
(6) Other network nodes are provisioned accordingly (not shown in the figure).
(7) Optionally, the M2M device is informed about his new profile and configured with new service data.
(8) The M2M device can access the new services provided to it.

The appended signaling diagrams can be considered not only to depict a series of messages exchanged and method steps performed by the various nodes, but also to depict apparatus for exchanging those messages or performing those method steps. In addition, for the sake of completeness, any message which is shown or described as being sent from node A to node B implicitly includes the step of node A sending the message as well as the step of node B receiving the message, and means at nodes A and B for performing those steps.

Figure 8:
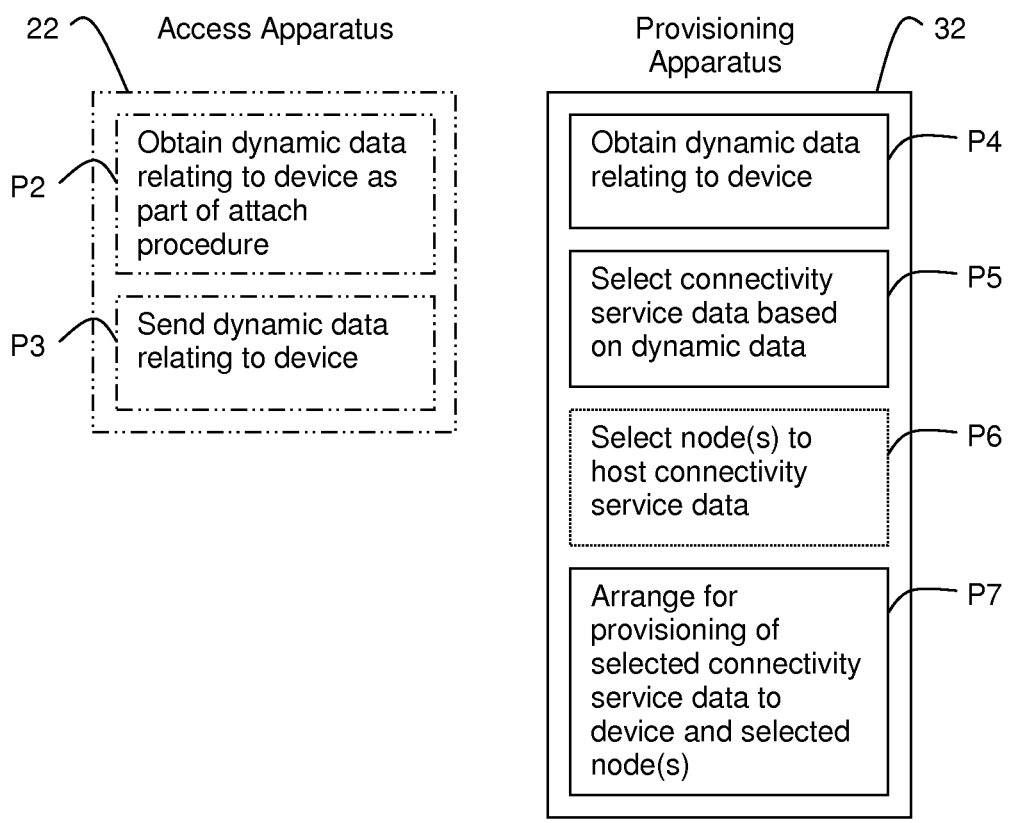
FIG. 8 is a schematic block diagram illustrating apparatus for performing a method embodying the present invention.

It will be appreciated that operation of one or more of the above-described components, particularly those illustrated in FIG. 8, can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. Any appended claims now or in future are to be interpreted as covering an operating program by itself, or as a record on a carrier, or as a signal, or in any other form.

Figure 9:
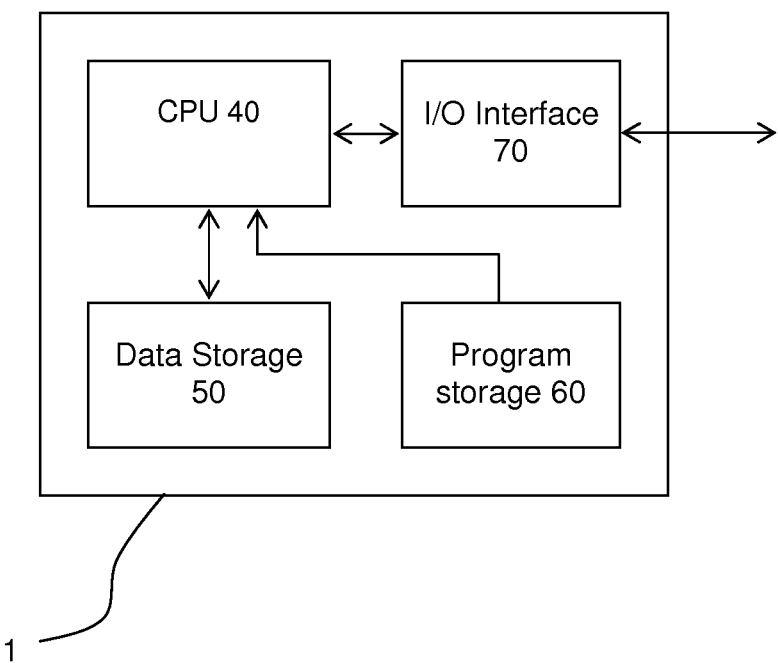
FIG. 9, discussed hereinbefore, is a schematic illustration of a node in which a method embodying the present invention can be implemented.

FIG. 9 is a schematic illustration of a node 1 in which a method embodying the present invention can be implemented. A computer program for controlling the node 1 to carry out a method embodying the present invention is stored in a program storage 60. Data used during the performance of a method embodying the present invention is stored in a data storage 50. During performance of a method embodying the present invention, program steps are fetched from the program storage 60 and executed by a Central Processing Unit (CPU) 40, retrieving data as required from the data storage 50. Output information resulting from performance of a method embodying the present invention can be stored back in the data storage 50, or sent to an Input/Output (I/O) interface 70, which may comprise a transmitter for transmitting data to other nodes, as required. Likewise, the Input/Output (I/O) interface 70 may comprise a receiver for receiving data from other nodes, for example for use by the CPU 40.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components.

The invention claimed is:

1. An auto-provisioning method for a device, the auto-provisioning method including an attachment phase and a registration phase, the auto-provisioning method for provisioning connectivity service data for the device when the device attaches to a telecommunications network, the connectivity service data comprising information required to enable connectivity between the device and at least one further device of the network, the method comprising:

obtain dynamic data, the dynamic data including information about a location of the device, the dynamic data obtained during one of a current attachment phase and a previous attachment phase, the dynamic data being of a type that may change from one such attachment to another such attachment of the same device;

selecting the connectivity service data based on the obtained dynamic data; and arranging for the selected connectivity service data to be provisioned to the device, the connectivity service data comprising information enabling the device to at least one of address and send data to the at least one further device, the connectivity service data further comprising at least one of
(a) an IP address;
(b) a port;
(c) a Uniform Resource Locator, URL;
(d) an "Access Point Name, APN"; and
(e) an identifier of a service center.

2. The method as claimed in claim 1, further comprising:
selecting, based on the obtained dynamic data, at least one node that will host at least some of the selected connectivity service data, and
arranging for the at least some connectivity service data to be provisioned to the at least one node.

3. The method as claimed in claim 2 wherein the at least some connectivity service data forms part of the profile data of the device, with the selecting the at least one node that will host the at least some connectivity service data being a step of selecting at least one node that will host the profile data of the device.

4. The method as claimed in claim 1, wherein the dynamic data comprise at least one of:
(a) a Location Area Identification, LAI;
(b) a Routing Area Identification, RAI;
(c) a Cell Identity, CI;
(d) a Cell Global Identification, GCI;
(e) a Base Station Identify Code, BSIC;
(f) a Regional Subscription Zone Identity RSZI;
(g) a Location Number;
(h) an MSC VLR identifier;
(i) an SGSN identifier;
(j) any other such information defined in sections 4 or 5 of 3GPP TS 23.003 V10.1.0; and
(k) geographical/geodetic data transmitted from the device or calculated by at least one network node for the device.

5. The method as claimed in claim 1, wherein the device is a Machine-to-Machine, M2M, device, and wherein the at least one further device is one of another M2M device, and an application server configured to collect data transmitted from M2M devices.

6. The method as claimed in claim 1, wherein obtaining the dynamic data comprises receiving the dynamic data in a message that triggers provisioning of the device.

7. The method as claimed in claim 1, wherein the network comprises a 3G network.

8. An apparatus for use in auto-provisioning, the auto-provisioning including an attachment phase and a registration phase, the apparatus for provisioning connectivity service data for a device when the device attaches to a telecommunications network, the connectivity service data comprising information required to enable connectivity between the device and at least one further device of the network, and the apparatus comprising:

means for obtaining dynamic data, the dynamic data including information about a location of the device, the dynamic data obtained during one of a current attachment phase and a previous attachment phase, the dynamic data being of a type that may change from one such attachment to another such attachment of the same device;

means for selecting the connectivity service data based on the obtained dynamic data; and means for arranging for the selected connectivity service data to be provisioned to the device, the connectivity service data comprising information enabling the device to at least one of address and send data to the at least one further device, the connectivity service data further comprising at least one of
(a) an IP address;
(b) a port;
(c) a Uniform Resource Locator, URL;
(d) an "Access Point Name, APN"; and
(e) an identifier of a service center.

9. The apparatus as claimed in claim 8, further comprising:
means for selecting, based on the obtained dynamic data, at least one node that will host at least some of the selected connectivity service data, and
wherein the means for arranging is configured to further arrange for the at least some connectivity service data to be provisioned to the at least one node.

10. The apparatus as claimed in claim 9, wherein the at least some connectivity service data forms part of the profile data of the device, with the means for selecting the at least one node that will host the at least some connectivity service data being the means for selecting at least one node that will host the profile data of the device.

11. The apparatus as claimed in claim 8, the apparatus being implemented in a provisioning system of the network.

12. The apparatus as claimed in claim 11, wherein the provisioning system comprises:
a Registration Operator, RO, as defined in 3GPP TR 33.812 V9.2.0 wherein the Registration Operator comprises a Discovery and Registration Function, DRF, and wherein the means for selecting is implemented by a Discovery and Registration Function and configured to select at least one of a node implementing the Download and Provisioning Function, DPF, and a node belonging to a Selected Home Operator, SHO, as the at least one node.

13. The apparatus as claimed in claim 8, wherein the means for obtaining the dynamic data comprise means for receiving the dynamic data in a message that triggers provisioning of the device.

14. A non-transitory computer-readable storage medium for use in auto-provisioning, the auto-provisioning including an attachment phase and a registration phase, the non-transitory computer-readable storage medium including instructions that, when executed by at least one central processing unit, enable the central processing unit to:

obtain dynamic data, the dynamic data including information about a location of a device, the dynamic data obtained during one of a current attachment phase and a previous attachment phase, the dynamic data being of a type that may change from one such attachment to another such attachment of the same device;

select connectivity service data based on the obtained dynamic data, the connectivity service data comprising information required to enable connectivity between the device and at least one further device; and arrange for the selected connectivity service data to be provisioned to the device, the connectivity service data comprising information enabling the device to at least one of address and send data to the at least one further device, the connectivity service data further comprising at least one of
(a) an IP address;
(b) a port;
(c) a Uniform Resource Locator, URL;
(d) an "Access Point Name, APN"; and
(e) an identifier of a service center.

* * * * *